United States Patent
Moustafa et al.

(10) Patent No.: US 11,228,869 B2
(45) Date of Patent: Jan. 18, 2022

(54) ROADWAY COMMUNICATION SYSTEM WITH MULTICAST

(71) Applicant: INTEL CORPORATION, Santa Clara, CA (US)

(72) Inventors: Hassnaa Moustafa, Portland, OR (US); Bahareh Sadeghi, Portland, WA (US); Dave Cavalcanti, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 132 days.

(21) Appl. No.: 16/490,222

(22) PCT Filed: Mar. 31, 2017

(86) PCT No.: PCT/US2017/025545
§ 371 (c)(1),
(2) Date: Aug. 30, 2019

(87) PCT Pub. No.: WO2018/182728
PCT Pub. Date: Oct. 4, 2018

(65) Prior Publication Data
US 2020/0008018 A1    Jan. 2, 2020

(51) Int. Cl.
*H04W 4/08* (2009.01)
*H04W 4/80* (2018.01)
(Continued)

(52) U.S. Cl.
CPC ........... *H04W 4/08* (2013.01); *G08G 1/22* (2013.01); *H04W 4/021* (2013.01); *H04W 4/027* (2013.01); *H04W 4/40* (2018.02); *H04W 4/80* (2018.02)

(58) Field of Classification Search
CPC ... H04L 12/1836; H04L 12/185; H04L 45/16; H04L 41/03893; H04L 41/12;
(Continued)

(56) References Cited

U.S. PATENT DOCUMENTS 7,532,622 B2 * 5/2009 Pung ..................... H04L 12/185
370/390
10,080,124 B2 * 9/2018 Tan .......................... H04W 4/08
(Continued)

OTHER PUBLICATIONS

"The Authoritative Dictionary of IEEE Standards Terms, Seventh Edition," in IEEE Std 100-2000, vol., No., pp. 1-1362, Dec. 11, 2000, doi: 10.1109/IEEESTD.2000.322230. pp. (i)-(x) and 712 (11 pages) (Year: 2000).*
(Continued)

*Primary Examiner* — Brian T O'Connor
(74) *Attorney, Agent, or Firm* — Schiff Hardin LLP

(57) ABSTRACT

Techniques for providing cooperative communication via multicast communications are disclosed. An example apparatus comprises a memory and processing circuitry coupled to the memory. The processing circuitry is configured to generate a multicast group address based, at least in part, on a geographical region of the apparatus, and broadcast the multicast group address to allow cooperative communication enabled devices to join a multicast group corresponding to the multicast group address. The apparatus is also configured to receive requests from the cooperative communication enabled devices to join the multicast group. The apparatus is also configured to transmit messages to the multicast group via multicast communications.

25 Claims, 7 Drawing Sheets

(51) Int. Cl.
*H04W 4/40* (2018.01)
*G08G 1/00* (2006.01)
*H04W 4/021* (2018.01)
*H04W 4/02* (2018.01)

(58) Field of Classification Search
CPC .............. H04L 12/1845; H04L 61/609; H04L 61/2069; H04L 67/12; H04W 4/08; H04W 4/80; H04W 4/40; H04W 4/021; H04W 4/027; H04W 4/12; H04W 4/06; H04W 4/02; G08G 1/22; G08G 1/096725; G08G 1/096783; G08G 1/096791; G08G 1/163
See application file for complete search history.

(56) References Cited

U.S. PATENT DOCUMENTS

| | | | | |
|---|---|---|---|---|
| 10,645,549 | B2* | 5/2020 | Pinheiro | H04W 4/40 |
| 10,743,155 | B2* | 8/2020 | Basu Mallick | H04W 8/24 |
| 2009/0285197 | A1 | 11/2009 | Chen et al. | |
| 2010/0256852 | A1 | 10/2010 | Mudalige | |
| 2011/0044172 | A1 | 2/2011 | Yim et al. | |
| 2014/0302774 | A1 | 10/2014 | Burke et al. | |
| 2016/0277210 | A1* | 9/2016 | Lin | H04L 45/66 |
| 2017/0006449 | A1 | 1/2017 | Igumnov et al. | |
| 2017/0272900 | A1* | 9/2017 | Do | H04W 4/02 |
| 2017/0365166 | A1* | 12/2017 | Lu | G08G 1/0133 |
| 2018/0034648 | A1* | 2/2018 | Nagarajan | H04L 69/325 |
| 2018/0047293 | A1* | 2/2018 | Dudar | B60W 30/165 |
| 2018/0122234 | A1* | 5/2018 | Nascimento | G08G 1/0145 |
| 2018/0122237 | A1* | 5/2018 | Nascimento | G08G 1/0965 |
| 2018/0295628 | A1* | 10/2018 | Lu | H04L 5/0058 |
| 2019/0014446 | A1* | 1/2019 | Gade | G08G 1/164 |
| 2019/0132832 | A1* | 5/2019 | Uchiyama | H04W 4/40 |
| 2020/0072963 | A1* | 3/2020 | Yu | G01S 7/006 |
| 2020/0077279 | A1* | 3/2020 | Foerster | G01S 7/02 |
| 2020/0245109 | A1* | 7/2020 | Yang | H04W 4/12 |

OTHER PUBLICATIONS

International Search Report for PCT Application Serial No. PCT/US2017/025545 with a completion and dated Dec. 22, 2017, 3 pages.

* cited by examiner

200

ROADWAY COMMUNICATION SYSTEM WITH MULTICAST

CROSS REFERENCE TO RELATED APPLICATIONS

Pursuant to 35 U.S.C. § 371, this application is the United States National Stage Application of International Patent Application No. PCT/US2017/025545, filed on Mar. 31, 2017, the contents of which are incorporated by reference as if set forth in their entirety herein.

TECHNICAL FIELD

The present techniques relate generally to communication systems. More specifically, the present techniques relate to a roadway communication system that provides multicast capability.

BACKGROUND

Vehicle-to-Everything (V2X) communication is an emerging technology that enables information passing between a vehicle to other entities within range of the vehicle, including other vehicles, roadside units, infrastructure components such as traffic lights, and others. V2X communication can be used in a wide range of applications, including automated driving, safety applications such as collision avoidance, traffic management, and others.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Various communication protocols have been developed to enable cooperative communication, such as V2X communications. One such protocol is Dedicated Short-Range Communications (DSRC), which is implemented through the IEEE 802.11p standard, also known as Wireless Access for Vehicular Environments (WAVE). DSRC is used to serve safety applications on roads through sharing information between vehicles and between road-side units and vehicles. Another emerging technology, often referred to as "smart cities," provides integration of Internet of Things (IoT) with urban infrastructure to enable a wide variety of services, including safety services, information services, and energy conservation, among others. Several wireless connectivity standards are being considered for enabling smart city applications, including, IEEE 802.15.4, IEEE 802.11h, 3rd Generation Partnership Project NarrowBand IoT (3GPP NB-IoT), Long Range Wide-Area Network, (LoRaWAN), and others.

The present specification describes techniques that enable cooperative communication such as DSRC to serve a dual role, to enable not only V2X (Vehicle-to-Infrastructure and Vehicle-to-Vehicle) communication but also road connectivity in general, including smart city and smart road applications. The present specification describes techniques for adding multicast support to the IEEE 802.11p DSRC protocol. However, it will be appreciated that the techniques described herein could also be applied to other cooperative communication protocols.

Providing multicast capability to the DSRC protocol enables messages dissemination among a specific group of vehicles, as opposed to broadcast communication which takes the form of flooding. In this way, channel contention can be reduced, which may result in lower latency and reduced bandwidth consumption compared to broadcast communications. This can be useful in platooning applications, cooperative driving, accident alerts, and the like in a specific region and when latency is critical, which is the case of most mission critical and autonomous driving applications.

Figure 1:
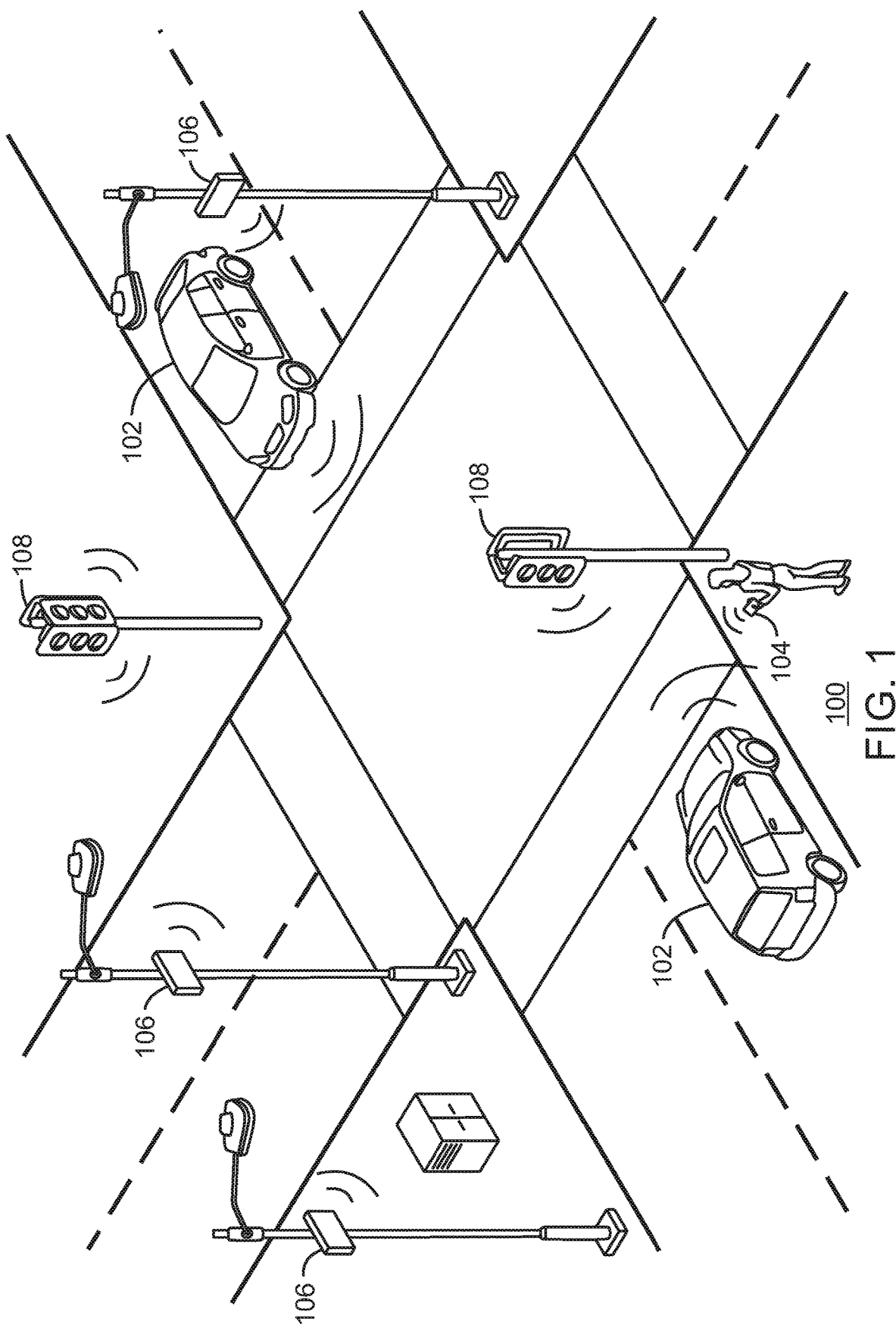
FIG. 1 illustrates a system of cooperative communication enabled devices.

FIG. 1 illustrates a system of cooperative communication, such as DSRC enabled devices. The cooperative communication enabled devices can include, but are not limited to, vehicles 102, user mobile devices 104, and roadside units 106, drones, machines, devices, etc. The roadside units 106 may be standalone devices mounted alongside a roadway and may also be incorporated in traffic lights 108, roadside lighting equipment, and others. In the context of the present disclosure, vehicles may be any of the cooperative communication enabled devices as mentioned above. Any of the cooperative communication enabled devices may be configured to communicate with any other cooperative communication enabled device within its wireless communication range to provide a range of information services. For example, vehicles 102 may exchange information to provide safety services such as cooperative adaptive cruise control, cooperative forward collision warning, intersection collision avoidance, and others. Vehicles 102 may also exchange information to enable a platooning service, which decreases the distances between vehicles and enables several vehicles to accelerate or brake simultaneously. Some of the vehicles shown in FIG. 1 may be autonomous driving vehicles.

Vehicles 102 may also exchange information with roadside units 106. A variety of services may be provided by the roadside units 106, depending on their configuration and capabilities. For example, roadside units 106 may collect position and speed information from vehicles 102, which may be used to generate statistical data about the traffic on specific roadways. Traffic information may then be sent back to vehicles 102 to inform drivers about the traffic flow for certain roadways and alert drivers about traffic related events, such as traffic jams, construction projects, traffic accidents, and the like. Some roadside units 106 may be configured to collect tolls or parking payments from motorists. Some roadside units 106 may also be configured to provide weather alerts to vehicles. A wide variety of additional information exchange is also possible.

Vehicles 102 may also exchange information with roadside units coupled to traffic lights 108. For example, traffic lights 108 may send information to vehicles 102 to warn motorists about upcoming light changes. Traffic lights 108 may also receive information from vehicles 102. The numbers of approaching vehicles at various intersection approaches may be used to help determine light changes to provide a smoother flow of traffic over the roadways. Traffic lights 108 may also receive information from pedestrians through mobile electronic devices 104 such as smart phones, smart watches, tablet computers, and the like. The number of pedestrians at a crosswalk can be taken into account for determining light changes. Traffic lights 108 can also exchange information with each other to coordinate light changes.

In some embodiments, the roadside units 108 may be coupled to a Wide Area Network (WAN) through various access points. For example, the roadside units 108 may be communicatively coupled to a WAN through a cellular communication standard, such as 4G, 5G, Long Term Evolution (LTE), or a WiFI wireless access point, for example. The connection to the WAN may enable the roadside units 108 to access a central management facility, such as a traffic management facility, toll collection facility, and others. The connection to the wide area network may enable the roadside units 108 to facilitate exchanges of information between the vehicles and servers connected to the wide area network.

In some cases, a cooperative communication enabled device may be configured for broadcast communications, in which information is addressed to all of the devices that are within wireless communication range. However, depending on the particular application, a particular cooperative communication enabled device may not benefit from the information that could be received by of all of the other cooperative communication enabled devices within range. For example, in the case of roadside unit configured for toll collection, the roadside unit may be configured to communicate only with approaching vehicles located within a small geographic area. Similarly, for a roadside unit configured to collect parking payments, the roadside unit may be configured to communicate with stationary vehicles within a small geographical area. In another example, traffic lights 108 may be configured to communicate with other traffic lights 108 and vehicles 102 at or approaching an intersection.

Accordingly, the protocol described herein is able to communicate through multicast communication, in which information is addressed to selected devices. The cooperative communication enabled devices are configured to be able to create multicast groups, which restricts communication to selected devices of interest. Additionally, multicast groups may agree to operate within a certain channel (e.g., a certain DSRC channel), which could help reduce contention from other devices that operate on other channels. A particular multicast group may be initiated and managed by a roadside unit 106, a vehicle 102, a traffic light 108, or other cooperative communication enabled device, depending on the particular application and road environment.

For example, as a vehicle 102 is approaching an intersection, a vehicle 102 can join or leave the multicast group initiated by the traffic light 108 based on geographical location and offered applications. After the vehicle 102 leaves the intersection, the traffic light 108 can remove the vehicle from the multicast group. Similarly, vehicles 102 may join or leave a multicast group initiated by a road side unit 106 depending on the vehicle's position within a geographical area, the speed and direction that the vehicle is travelling, whether the vehicle is approaching or leaving, and other factors.

Roadside units 106 can join the multicast group of other roadside units on demand to form a backend network. Since the position of roadside units is fixed, the backend roadside units can remain in the multicast group as long as it's alive and as long as the roadside units have the capacity to offer connectivity and provide data services.

Vehicles 102 may also be able to manage multicast groups. For example, in a platooning application, the vehicles within a platoon may join a multicast group that restricts communication with only those vehicles within the platoon. Vehicles 102 may be join or leave the multicast group initiated by a platoon leader as they enter or leave the platoon.

Conducting communications through multicast groups can reduce latency and improve efficiency and reliability of the roadside communications. Multicast also enables service providers to provide specialized, class-based services such as platooning, wherein communication can be restricted to participating or authorized devices. Additionally, multicast communication for a particular service may be restricted to a specific channel agreed to by the multicast group, which may have less data traffic compared to other broadcast channels that are shared by all devices.

The description provided above describes example of the types of capabilities that may be realized with a cooperative communication protocol that provides multicast capabilities. It will be appreciated that any number of additional types of services and capabilities may be realized. A multicast DSRC protocol is described further below.

Figure 2:
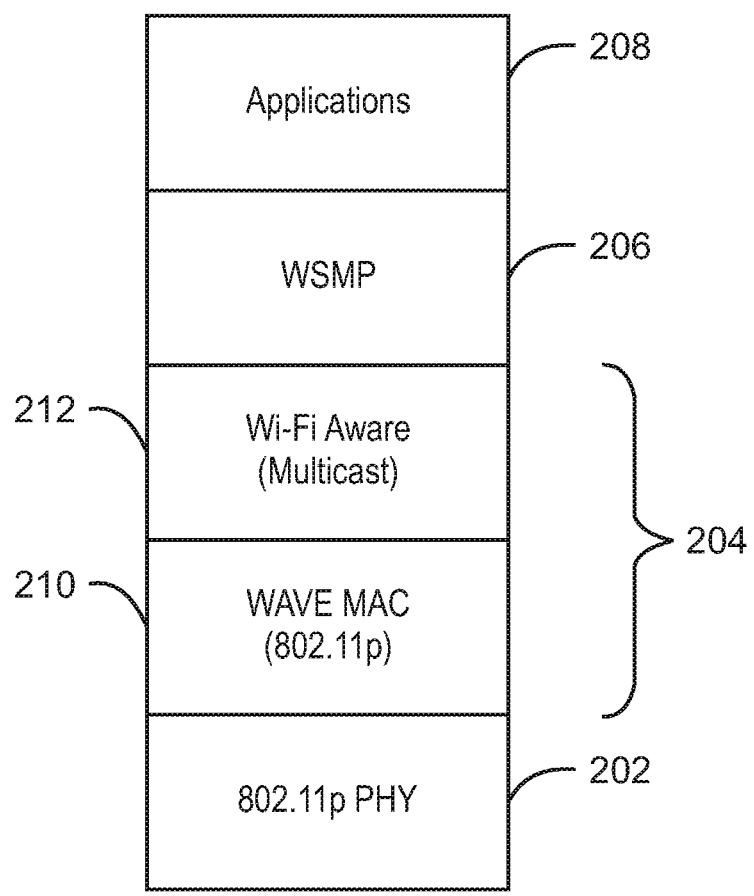
FIG. 2 is an example software stack that may be used to implement multicast communications in cooperative communication.

FIG. 2 is an example software stack that may be used to implement multicast communications in DSRC. The software stack 200 may be deployed in any of the cooperative communication enabled devices described in relation to FIG. 1. The software stack shown in FIG. 2 may be implemented in hardware or a combination of hardware and programming code stored as software or firmware. Example implementations of the software stack 200 are described further in relation to FIG. 6.

With reference to the Open Systems Interconnection (OSI) model, the software stack includes a physical layer 202 (layer 1), a data link layer 204 (layer 2), and a transport layer 206 (layer 4). The software stack also includes one or more applications 208.

The applications 208 may be DSRC applications, including safety applications, autonomous driving applications, traffic or weather alert applications, entertainment applications, and others. The physical layer 202 includes the physical hardware for sending and receiving signals to and from the device's antenna systems. The physical layer 202 may be implemented in accordance with the 802.11p PHY specification.

The data link layer 204 includes a Wave Media Access Controller (MAC) 210 and a WiFi Aware service layer 212. The Wave MAC 210 provides addressing and channel access control mechanisms that enable the nodes in the network to communicate. The WAVE MAC 210 may be implemented in accordance with 802.11p specification. The WAVE MAC 210 also enables cooperative communication enabled devices to communicate with each other without first establishing a Basic Service Set (BSS).

WiFi Aware is a protocol that enables device users when in the range of a WiFi transmitter to receive notifications of applications or services available in the proximity. The WiFi Aware service layer 212 is configured to generate advertisements that inform other cooperative communication enabled devices of the services provided and information that enables the cooperative communication enabled devices to communicate. For example, in the case of an autonomous driving vehicle, the vehicle may advertise a proprietary platooning service so that other similarly equipped vehicles can join a multicast group to form a platoon. The multicast functionality of the protocol is controlled by the WiFi Aware service layer 212 which is a part if the data link layer (layer 2). The Wi-Fi Aware layer can also be configured to control the DSRC channels to be used by a group.

The transport layer 206 may be implemented using the Wave Short Message Protocol (WSMP). The WSMP transport layer 206 provides an abstraction of the network to the application and provides a message delivery service to the application through packet transfers. The WSMP transport layer 206 handles the transfers of data between source and destination devices.

In some embodiments, the WiFi Aware service layer 212 may be used to implement WAVE channel coordination and coordinate a multicast service over the 802.11p MAC and PHY. The Wi-Fi Aware service layer 212 may provide a multicast service to the upper layers, e.g., the WSMP layer and Application, and can leverage the control channel (CCH) in WAVE for mission critical applications. The WiFi Aware service layer 212 can also provide additional services, including device discovery, multicast group formation, synchronization, and data communications. For example, the Wi-Fi Aware protocol can enable a group of devices to discovery each other and synchronize their radios to the same reference time so they can agree on a schedule where communication can take place on a given channel. Once a schedule (e.g. time and channel) is agreed by the group, data messages can be transmitted. In this case, data may include any application layer messages delivered over the software stack 200. The Wi-Fi Aware synchronization will enable devices to save power, which is important for devices that could be used by pedestrians, such as mobile phones, bikes, and others.

The higher layer applications 208 may further leverage context-aware information available (e.g., device type, location, etc.) to initiate and manage the multicast groups. The higher layer applications 208 can be configured to determine the requirements for creating multicast groups, determine whether a device may be allowed to enter a multicast group, and other group management functions. The protocol to implement multicast group management decisions is provided by the Wi-Fi Aware service layer 212.

The IEEE 802.11p standard defines seven 10 MHz channels within the 75 MHz bandwidth of the 5.9 GHz band (5.850-5.925 GHz) reserved for DSRC applications. These channels may be referred to herein a WAVE channels. The WAVE channels are defined by the WAVE MAC and can include at least one control channel (CCHs) and a number of service channels (SCHs). In some embodiments, the Wi-Fi Aware service layer 212 can be configured to establish communication over specific WAVE channels depending on the requirements for the multicast communication service. For example, the service channels may be used to transmit lower priority messages, such as traffic awareness information or weather related information, while the control channel may be reserved for carrying high-priority short messages or management data. Examples of high-priority short messages include messages used in controlling the behavior of vehicles driving in a platoon and safety messages such as collision avoidance messages. Examples of management data include multicast group address updates, messages exchanged between vehicles in a platoon to distribute a decision taken by the platoon leader, and messages to distribute specific actions that the group must take (e.g. changing driving direction, etc). In some examples, the channel over which a particular service is provided may be dynamically updated to select the best channel for a given message for a group at any given time. For example, if a service channel is not used in an area, the multicast group could use it for high priority messages as well.

Figure 3:
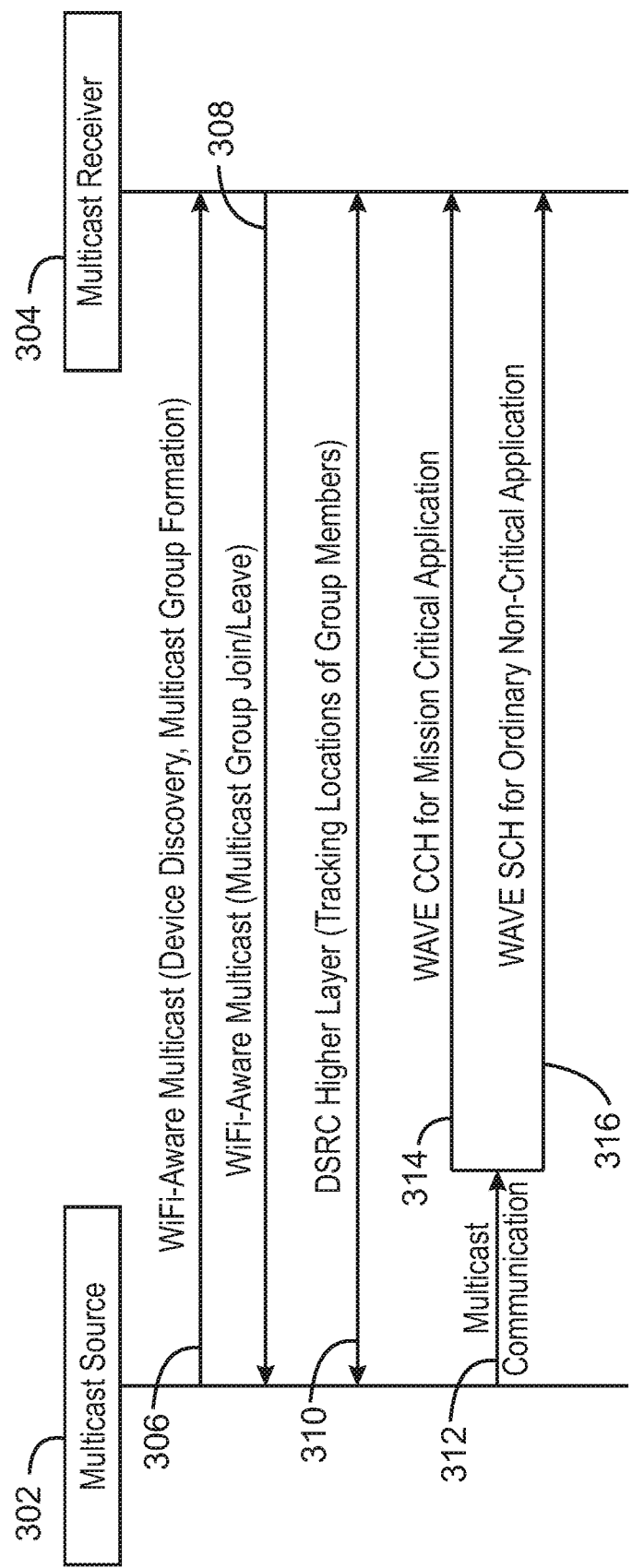
FIG. 3 is diagram illustrating data flow between a multicast source and a multicast receiver.

FIG. 3 is diagram illustrating data flow between a multicast source and a multicast receiver. The multicast source 302 may be any cooperative communication enabled device, including the cooperative communication enabled devices shown in FIG. 1. Similarly, the multicast receiver 304 may also be any cooperative communication enabled devices, including the cooperative communication enabled devices shown in FIG. 1. The multicast source 302 is configured as the lead device, which configures and manages multicast groups. For example, the multicast source 302 may be a lead vehicle in a platoon of autonomous driving vehicles, a roadside unit, and the like.

At 306, the multicast source 302 transmits advertisements via the WiFi Aware multicast service. The advertisements may be transmitted periodically and include device discovery information and multicast group formation information. The device discovery information includes information about the type services provided by the multicast source. The multicast group formation information includes information that enables the multicast group receivers 304 to join the multicast group, such as channel information, link protocol, multicast group address, service types for this multicast group, and others. The multicast group formation information can also include radio configuration information, including transmission power, channel access parameters such as carrier sense and backoff parameters, and time synchronization parameters. The multicast group formation information can also include geographical information that identifies a geographical area to which the multicast group applies. The advertisements are broadcast and can be received by any other devices within wireless range of the multicast source 302.

Based on the device discovery and multicast group formation information, the multicast receiver 304 makes a determination of whether to join the multicast group. The determination may be based on whether the multicast receiver 304 is within the geographical area defined by the multicast source 302 and whether the multicast receiver 304 is interested by the advertised services and is equipped to use the service provided by the multicast source 302.

At 308, the multicast receiver 304 transmits a join or leave message to the multicast source 302, via the WiFi Aware multicast service, informing the multicast source 302 that it has joining or is leaving the multicast group. The join message may include identifying information that enables the multicast source 302 to uniquely identify each of the devices within the multicast group for future communications.

At 310, a higher layer DSRC application exchanges location tracking information with the multicast receiver 304. For example, if the multicast receiver 304 is a vehicle, the multicast receiver 304 may send position coordinates, as well as speed and direction of travel information.

At 312, the multicast source transmits multicast messages at the MAC layer level to members of the multicast group. Some multicast messages may be send through the control channel, while other multicast messages may be sent through one of the service channels. For example, the control channel may be used to transmit data for mission critical applications, such as safety applications, platooning applications, and others. In some examples, the service channel may be used to transmit data for non-mission critical applications, such as weather and traffic information and the like.

It will be appreciated that the process flow described above is an example process flow and that the order in which various actions occur can vary from what is described. For example, various additional data exchanges may be conducted depending on the services provided by the multicast source 302 and the capabilities of the multicast receiver 304. Additionally, the multicast source 302 will be capable of communicating with multiple multicast receivers 304.

Figure 4:
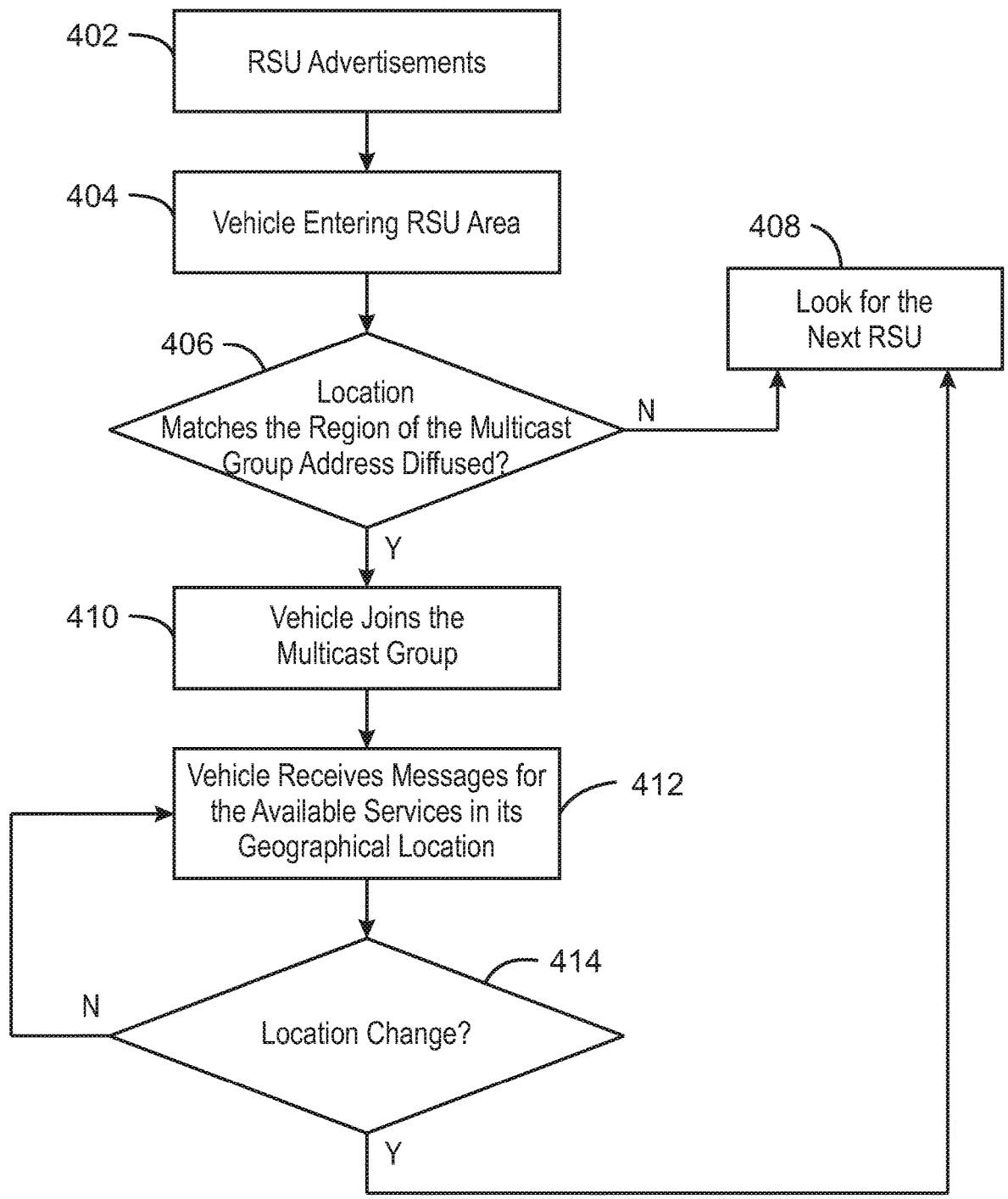
FIG. 4 is a process flow diagram of method for creating a multicast group by a roadside unit.

FIG. 4 is a process flow diagram of method for creating a multicast group by a roadside unit. The method 400 may begin at block 402.

At block 402, the roadside unit broadcasts advertisements, which identify the type of device, the services provided, and the multicast group address assigned to the roadside unit. Each roadside unit of a particular service provider may be assigned a unique multicast group address based on the geographical area covered by the roadside unit. The multicast group address is advertised through broadcast at the MAC layer level. Also, knowledge of multicast group addresses can be shared in advance. This multicast group address can be composed of a service category identifier and the location information for the geographical area. In some examples, the location information can include a geographical position and distance information that defines the geographical area covered by the roadside unit.

In some embodiments, the multicast group address is a fixed address which may be set by the service operator. However, in some embodiments, the multicast group address may change dynamically to enlarge or reduce the size of the geographical region covered by the roadside unit. Changing the multicast group address to change the size of the covered region can be used to ensure that the number of vehicles in the multicast group does not pass a defined threshold. For example, the roadside unit may be configured to receive information about average vehicle speed and the vehicle density in the area around the roadside unit. Based on the vehicle density and average speed, the roadside unit can compute a coverage area size that will ensure that the number of vehicles in the covered region does not exceed the threshold.

At block 404, a vehicle enters within the wireless communication range of the roadside unit and receives the advertisement broadcast by the roadside unit.

At block 406, the vehicle makes a determination regarding whether its own location matches the region of the advertised multicast group address. If the location does not match, the vehicle does not join the multicast group and the process flow advances to block 408. At block 408, the vehicle continues receiving roadside unit advertisements. If the vehicle encounters a new roadside unit, the process flow returns to block 404.

If at block 406, the location does match the region of the advertised multicast group address, the process flow advances to block 410, and the vehicle joins the multicast group.

At block 412, the vehicle receives messages from the roadside unit for the available services in its geographical region.

At block 414, the vehicle determines whether it has moved outside of the region covered by the roadside unit as indicated by the multicast group address. If the vehicle is still within the region covered by the roadside unit, the process flow returns to block 412 and the vehicle continues receiving multicast messages. If the vehicle has moved outside the region covered by the roadside unit, the process flow returns to block 408 where the vehicle looks for the next roadside unit.

The method 400 should not be interpreted as meaning that the blocks are necessarily performed in the order shown. Furthermore, fewer or greater actions can be included in the method 400 depending on the design considerations of a particular implementation.

Figure 5:
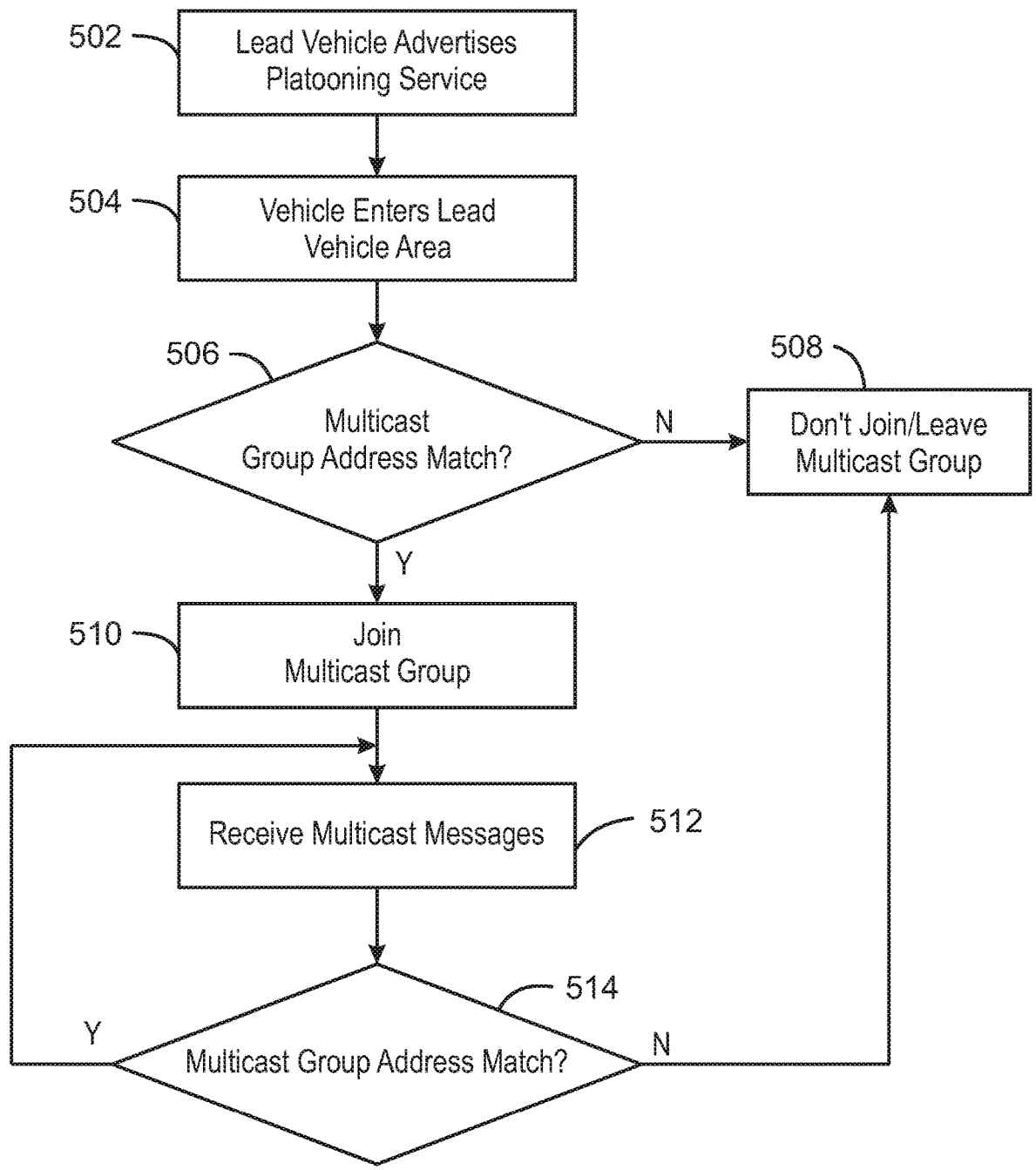
FIG. 5 is a process flow diagram of method for creating a multicast group by a cooperative communication enabled vehicle.

FIG. 5 is a process flow diagram of method for creating a multicast group by a cooperative communication enabled vehicle. The method 500 may be performed by a vehicle, referred to herein as a platoon leader, which is configured to provide a platooning service to other cooperative communication enabled vehicles in the surrounding environment. The method 500 may begin at block 502.

At block 502, the platoon leader advertises a platooning service. The advertisement can include the type of device, the service provided, and the multicast group address assigned to the platoon by the lead vehicle. The platoon leader may generate a unique multicast group address based in part on the geographical area covered by the platooning service offered by the platoon leader. The multicast group address is advertised through broadcast at the MAC layer level. The multicast group address can be composed of a service category identifier, a speed and direction of the platoon leader, and the location information for the geographical area. In some examples, the location information can include a geographical position and distance information that defines the geographical area covered by the platoon leader. Alternatively, the multicast group address can be a unique address value that is mapped to the above information and is distributed by the group leader. In this way, the advertised information in every frame can be reduced, so the address size can be smaller, but there is still a connection between address and geographical area.

In some embodiments, the platoon leader updates the multicast group address as the platoon leader's geographical position changes. Furthermore, as described above in relation to FIG. 4, the size of the geographical region covered by the platoon leader may be enlarged or reduced to ensure that the number of vehicles in the multicast group does not pass a defined threshold. In some embodiments, the platoon leader sends refresh messages through multicast (before leaving the current geographical area) to announce the new multicast group address applicable for the platoon.

At block 504, a vehicle enters within the wireless communication range of the platoon leader and receives the advertisement broadcast by the platoon leader.

At block 506, the vehicle makes a determination regarding whether its own location matches the region of the advertised multicast group address. If the location does not match, the process flow advances to block 508 and the vehicle does not join the multicast group. If at block 506, the location does match the region of the advertised multicast group address, the process flow advances to block 510, and the vehicle joins the multicast group.

At block 512, the vehicle receives messages from the platoon leader for the platooning service. For example, the vehicle may receive instructions regarding speed, acceleration, braking, and the like.

At block 514, the vehicle determines whether it has transitioned outside of the region covered by the platoon as indicated by the multicast group address. The vehicle may have transitioned outside of the region covered by the platoon leader if its own movement puts it outside the geographical region covered by the platoon leader, or if the multicast group address broadcast by the platoon leader changes based on the movement of the platoon leader, or both.

If the vehicle is still within the region covered by the platoon leader, the process flow returns to block 512 and the vehicle continues receiving multicast messages. If the vehicle has moved outside the region covered by the roadside unit, the process flow returns to block 508 and the vehicle leaves the multicast group.

The method 500 should not be interpreted as meaning that the blocks are necessarily performed in the order shown. Furthermore, fewer or greater actions can be included in the method 500 depending on the design considerations of a particular implementation.

Figure 6:
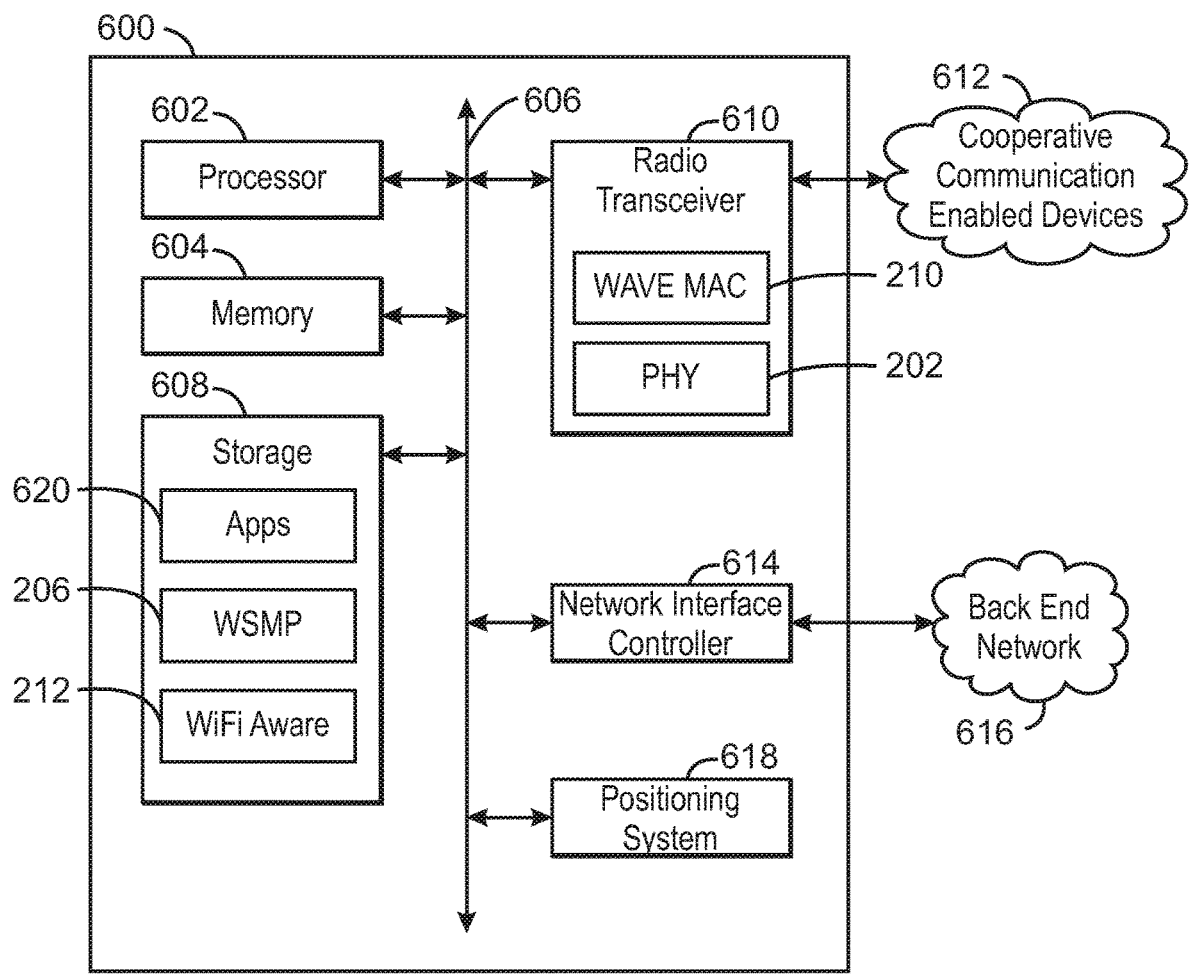
FIG. 6 is a block diagram of an example system of components that may be present in a cooperative communication enabled device configured for multicast communication.

FIG. 6 is a block diagram of an example system of components that may be present in a cooperative communication enabled device configured for multicast DSRC communication. The system 600 may be included in any of the cooperative communication enabled devices described herein. For example, system 600 may be included in a vehicle, an autonomous driving vehicle, and a roadside unit, among others. The components may be implemented as ICs, portions thereof, discrete electronic devices, or other modules, logic, hardware, software, firmware, or a combination thereof adapted in the device, or as components otherwise incorporated within a chassis of a larger device. The block diagram of FIG. 6 is intended to show a high level view of components of the system 600. However, some of the components shown may be omitted, additional components may be present, and different arrangement of the components shown may occur in other implementations.

The system 600 may include a processor 602, which may be a microprocessor, a multi-core processor, a multithreaded processor, an ultra-low voltage processor, an embedded processor, or other known processing element. The processor 602 may be a part of a system on a chip (SoC) in which the processor 602 and other components are formed into a single integrated circuit, or a single package, such as the Edison™ or Galileo™ SoC boards from Intel. As an example, the processor 602 may include an Intel® Architecture Core™ based processor, such as a Quark™, an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5, A9, or similar, processor from Apple® Inc., a Snapdragon™ processor from Qualcomm® Technologies, Inc., or an OMAP™ processor from Texas Instruments, Inc.

The processor 602 may communicate with a system memory 604 over a bus 606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, drivers, operating systems and so forth, a mass storage 608 may also couple to the processor 602 via the bus 606. The mass storage 608 may be implemented via any type of non-transitory, machine-readable medium, such as a solid state disk drive (SSDD), a hard drive, an array of hard drives, an optical disk, a thumb drive, and the like. In some examples, the mass storage 608 may be implemented using a micro hard disk drive (HDD), such as in IoT devices. Further, any number of new technologies may be used for the mass storage 608 in addition to, or instead of, the technologies described, such resistance change memories, phase change memories, holographic memories, or chemical memories, among others. For example, the system 600 may incorporate the 3D XPOINT memories from Intel® and Micron®.

The components may communicate over the bus 606. The bus 606 may include any number of technologies, including industry standard architecture (ISA), extended ISA (EISA), peripheral component interconnect (PCI), peripheral component interconnect extended (PCIx), PCI express (PCIe), or any number of other technologies. The bus 606 may be a proprietary bus, for example, used in a SoC based system. Other bus systems may be included, such as an $I^2C$ interface, an SPI interface, and point to point interfaces, among others.

The bus 606 may couple the processor 602 to a radio transceiver 610, for communications other cooperative communication enabled devices 612, including other vehicles, roadside units, and the like. The radio transceiver 610 may be configured in accordance with the WAVE DSRC communications protocol, also known as IEEE 802.11p.

The radio transceiver 610 can also include any number of protocols for communication with a back-end network, such as a WLAN unit used to implement Wi-Fi™ communications in accordance with the Institute of Electrical and Electronics Engineers (IEEE) 802.11 standard. In addition, wireless wide area communications, e.g., according to a cellular or other wireless wide area protocol, may be implemented via a WWAN unit. The bus 606 may couple the processor 602 to a network interface controller (NIC) 614 that may couple to the back-end network over a wired connection.

The bus 606 may couple the processor 602 to a positioning system 618, such as Global Positioning System (GPS), Galileo, and others. The positioning system may also include a local positioning system that relies on WiFi access points, cellular base stations, and the like.

The mass storage 608 can store one of more applications, including DSRC applications such as safety applications, information service applications, autonomous driving applications, and platooning applications, among others. The protocol described herein may be implemented using one or more of the components shown in FIG. 6. For example, as shown in FIG. 6, the WSMP layer 206 and WiFi Aware service layer 212 may be stored to the mass storage 608 to be loaded into system memory 604 and run by the processor 602, while the WAVE MAC 210 and physical layer 202 may be incorporated in the radio transceiver 610. In other embodiments, the WSMP layer 206, WiFi Aware service layer 212, WAVE MAC 210, and physical layer 202 may all be implemented in the radio transceiver 610. Other implementations are also possible.

Figure 7:
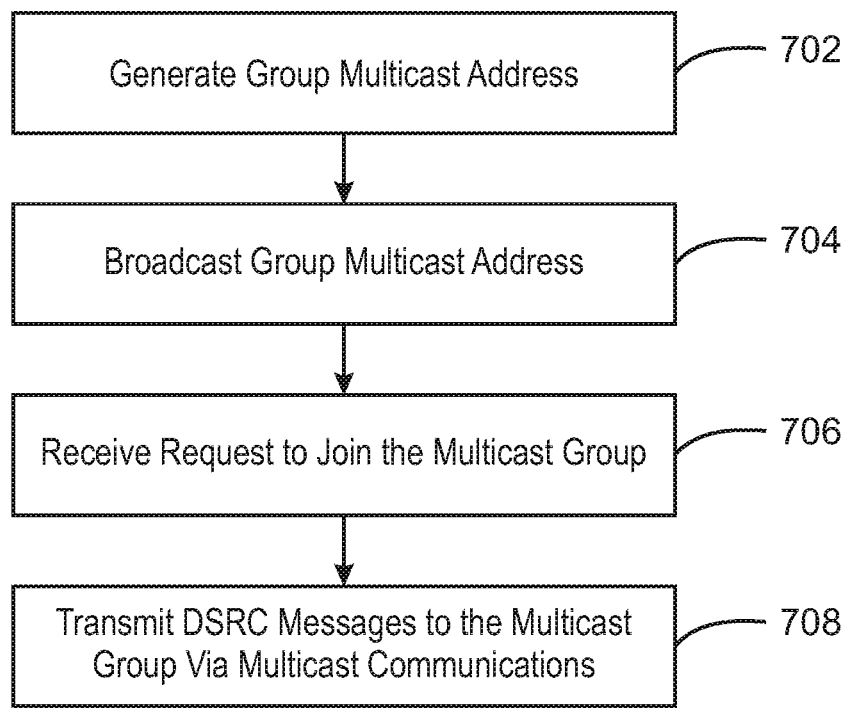
FIG. 7 is a simplified process flow diagram summarizing a method of providing cooperative communication messages via multicast.

FIG. 7 is a simplified process flow diagram summarizing a method of providing cooperative communication messages (e.g., DSRC messaged) via multicast. The method 700 may be implemented by the system 600 described in FIG. 6. The method may begin at block 702. At block 702, a multicast group address is generated. The multicast group address may be generated based, at least in part, on a geographical region of the multicast group, which may be determined by the location of a roadside unit, or autonomous driving vehicle, for example.

At block 704, the multicast group address is broadcast to allow cooperative communication enabled devices to join the multicast group. The multicast group address may be broadcast using the WiFi Aware protocol.

At block 706, requests to join the multicast group are received from cooperative communication enabled devices. A cooperative communication enabled device may request to join the multicast group if the parameters of the multicast group address coincide with the device's own location and capabilities.

At block 708, messages are transmitted to the multicast group via multicast communications. The messages may be DSRC messages. The multicast communication may be managed at the data link layer (layer 2), for example, by the WiFi aware service layer and WAVE MAC.

Examples

Example 1 is an apparatus for cooperative communication via multicast communications. The apparatus includes a memory and processing circuitry coupled to the memory. The processing circuitry is configured to: generate a multicast group address based, at least in part, on a geographical region of the apparatus; broadcast the multicast group address to allow cooperative communication enabled devices to join a multicast group corresponding to the multicast group address; receive requests from the cooperative communication enabled devices to join the multicast group; and transmit messages to the multicast group via multicast communications.

Example 2 includes the apparatus of example 1, including or excluding optional features. In this example, the apparatus includes a Wireless Access for Vehicular Environments (WAVE) Media Access Controller (MAC) and WiFi Aware layer, wherein the WiFi Aware layer is to coordinate the multicast communications through the WAVE MAC. Optionally, the apparatus includes a DSRC application and a Wave Short Message Protocol (WSMP) layer to provide message passing services to DSRC application, wherein the WiFi Aware layer is to provide a multicast service to the DSRC application and WSMP layer.

Example 3 includes the apparatus of any one of examples 1 to 2, including or excluding optional features. In this example, the multicast group address comprises a location and distance which together define a geographical region of the multicast group.

Example 4 includes the apparatus of any one of examples 1 to 3, including or excluding optional features. In this example, the apparatus is configured to dynamically update the multicast group address to limit a number of cooperative communication enabled devices that can join the multicast group. Optionally, to dynamically update the multicast group address, the apparatus updates a distance from the apparatus based at least in part on traffic density.

Example 5 includes the apparatus of any one of examples 1 to 4, including or excluding optional features. In this example, the apparatus is configured to dynamically update the multicast group address based on movement of the apparatus and services offered.

Example 6 includes the apparatus of any one of examples 1 to 5, including or excluding optional features. In this example, the apparatus is configured to select a channel on which to transmit the messages and wherein the multicast group address is based in part on the channel.

Example 7 includes the apparatus of any one of examples 1 to 6, including or excluding optional features. In this example, the apparatus is included in a stationary roadside unit.

Example 8 includes the apparatus of any one of examples 1 to 7, including or excluding optional features. In this example, the apparatus is included in a vehicle configured to provide a platooning service via multicast communications.

Example 9 is a tangible, non-transitory, computer-readable medium comprising instructions that, when executed by a processor, direct the processor to create a multicast group for cooperative communications. The computer-readable medium includes instructions that direct the processor to generate a multicast group address based, at least in part, on a geographical region; control a wireless transmission to broadcast the multicast group address to allow cooperative communication enabled devices to join a multicast group corresponding to the multicast group address; receive requests from the cooperative communication enabled devices to join the multicast group; and control a wireless transmission of messages to the multicast group via multicast communications.

Example 10 includes the computer-readable medium of example 9, including or excluding optional features. In this example, the computer-readable medium includes a WiFi Aware layer to coordinate the multicast communications through a Wireless Access for Vehicular Environments (WAVE) Media Access Controller (MAC). Optionally, the computer-readable medium includes a DSRC application and a Wave Short Message Protocol (WSMP) layer that provides message passing services to DSRC application, wherein the WiFi Aware layer provides a multicast service to the DSRC application and WSMP layer.

Example 11 includes the computer-readable medium of any one of examples 9 to 10, including or excluding optional features. In this example, the multicast group address comprises a location and distance which together define a geographical region of the multicast group.

Example 12 includes the computer-readable medium of any one of examples 9 to 11, including or excluding optional features. In this example, the computer-readable medium includes instructions to direct the processor to dynamically update the multicast group address to limit a number of cooperative communication enabled devices that can join the multicast group. Optionally, to dynamically update the multicast group address, the instructions direct the processor to update a distance based at least in part on traffic density.

Example 13 includes the computer-readable medium of any one of examples 9 to 12, including or excluding optional features. In this example, the computer-readable medium includes instructions to direct the processor to dynamically update the multicast group address based on movement and services offered.

Example 14 includes the computer-readable medium of any one of examples 9 to 13, including or excluding optional features. In this example, the computer-readable medium includes instructions to direct the processor to select a channel on which to transmit the DSRC messages, wherein the multicast group address is based in part on the channel.

Example 15 includes the computer-readable medium of any one of examples 9 to 14, including or excluding optional features. In this example, the computer-readable medium is configured to be included in a stationary roadside unit.

Example 16 includes the computer-readable medium of any one of examples 9 to 15, including or excluding optional features. In this example, the computer-readable medium is configured to be included in a vehicle configured to provide a platooning service via multicast communications.

Example 17 is a method of providing cooperative communication messages via multicast. The method includes generating a multicast group address based, at least in part, on a geographical region of a multicast group; broadcasting the multicast group address to allow cooperative communication enabled devices to join the multicast group; receiving requests from the cooperative communication enabled devices to join the multicast group; and transmitting messages to the multicast group via multicast communications.

Example 18 includes the method of example 17, including or excluding optional features. In this example, the method includes coordinating the multicast communications by a WiFi Aware service that controls a Wireless Access for Vehicular Environments (WAVE) Media Access Controller (MAC). Optionally, the method includes providing message passing services to a DSRC application through a Wave Short Message Protocol (WSMP) layer, wherein the WiFi Aware service provides a multicast service to the DSRC application and the WSMP layer.

Example 19 includes the method of any one of examples 17 to 18, including or excluding optional features. In this example, the multicast group address comprises a location and distance which together define a geographical region of the multicast group.

Example 20 includes the method of any one of examples 17 to 19, including or excluding optional features. In this example, the method includes dynamically updating the multicast group address to limit a number of cooperative communication enabled devices that can join the multicast group. Optionally, dynamically updating the multicast group address comprises updating a coverage distance of the multicast group based at least in part on traffic density in a geographical region of the multicast group.

Example 21 includes the method of any one of examples 17 to 20, including or excluding optional features. In this example, the method includes dynamically updating the multicast group address based on movement of a vehicle and services offered.

Example 22 includes the method of any one of examples 17 to 21, including or excluding optional features. In this example, the method includes selecting a channel on which to transmit the messages and wherein the multicast group address is based in part on the channel.

Example 23 includes the method of any one of examples 17 to 22, including or excluding optional features. In this example, transmitting the messages comprises transmitting the messages from a stationary roadside unit.

Example 24 includes the method of any one of examples 17 to 23, including or excluding optional features. In this example, transmitting the messages comprises transmitting the messages from a vehicle configured to provide a platooning service via multicast communications.

Example 25 is an apparatus for cooperative communication via multicast communications. The apparatus includes means for generating a multicast group address based, at least in part, on a geographical region of the apparatus; means for broadcasting the multicast group address to allow cooperative communication enabled devices to join a multicast group corresponding to the multicast group address; means for receiving requests from the cooperative communication enabled devices to join the multicast group; and means for transmitting messages to the multicast group via multicast communications.

Example 26 includes the apparatus of example 25, including or excluding optional features. In this example, the apparatus includes means for coordinating the multicast communications by a WiFi Aware service that controls a Wireless Access for Vehicular Environments (WAVE) Media Access Controller (MAC). Optionally, the apparatus includes means for providing message passing services to a DSRC application through a Wave Short Message Protocol (WSMP) layer, wherein the WiFi Aware service provides a multicast service to the DSRC application and the WSMP layer.

Example 27 includes the apparatus of any one of examples 25 to 26, including or excluding optional features. In this example, the multicast group address comprises a location and distance which together define a geographical region of the multicast group.

Example 28 includes the apparatus of any one of examples 25 to 27, including or excluding optional features. In this example, the apparatus includes means for dynamically updating the multicast group address to limit a number of cooperative communication enabled devices that can join the multicast group. Optionally, the means for dynamically the multicast group address updates a distance from the apparatus based at least in part on traffic density.

Example 29 includes the apparatus of any one of examples 25 to 28, including or excluding optional features. In this example, the apparatus includes means for dynamically updating the multicast group address based on movement of the apparatus and services offered.

Example 30 includes the apparatus of any one of examples 25 to 29, including or excluding optional features. In this example, the apparatus includes means for selecting a channel on which to transmit the messages, wherein the multicast group address is based in part on the channel.

Example 31 includes the apparatus of any one of examples 25 to 30, including or excluding optional features. In this example, the apparatus is included in a stationary roadside unit.

Example 32 includes the apparatus of any one of examples 25 to 31, including or excluding optional features. In this example, the apparatus is included in a vehicle configured to provide a platooning service via multicast communications.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for cooperative communication via multicast communications comprising:
   a memory; and
   processing circuitry coupled to the memory, wherein the processing circuitry is configured to:
      generate a multicast group address based, at least in part, on a geographical region of the apparatus;
      broadcast the multicast group address to allow cooperative communication enabled devices to join a multicast group corresponding to the multicast group address;
      receive requests from the cooperative communication enabled devices to join the multicast group; and
      transmit cooperative communication messages to the multicast group via multicast communications.

2. The apparatus of claim 1, further comprising a Wireless Access for Vehicular Environments (WAVE) Media Access Controller (MAC) protocol layer and WiFi Aware layer within the processing circuitry, wherein the WiFi Aware layer coordinates the multicast communications through the WAVE MAC.

3. The apparatus of claim 2, further comprising a Dedicated Short-Range Communications (DSRC) application and a Wave Short Message Protocol (WSMP) layer within the processing circuitry to provide message passing services to the DSRC application, wherein the WiFi Aware layer provides a multicast service to the DSRC application and WSMP layer.

4. The apparatus of claim 1, wherein the multicast group address comprises a location and distance that define a geographical region of the multicast group.

5. The apparatus of claim 1, wherein the processing circuitry is configured to dynamically update the multicast group address to limit a number of cooperative communication enabled devices that can join the multicast group.

6. The apparatus of claim 5, wherein processing circuitry dynamically updates the multicast group address, by updating a distance from the apparatus based at least in part on traffic density.

7. The apparatus of claim 1, wherein the processing circuitry is configured to dynamically update the multicast group address based on movement of the apparatus and services offered.

8. The apparatus of claim 1, wherein the processing circuitry is configured to select a channel on which to transmit the cooperative communication messages and wherein the multicast group address is based in part on the channel.

9. The apparatus of claim 1, wherein the apparatus is implemented in a stationary roadside unit.

10. The apparatus of claim 1, wherein the apparatus is implemented in a vehicle configured to provide a platooning service via multicast communications.

11. A tangible, non-transitory, computer-readable medium comprising instructions that, when executed by a processor, direct the processor to create a multicast group for cooperative communications, the instructions to direct the processor to:
   generate a multicast group address based, at least in part, on a geographical region;
   control a wireless transmission to broadcast the multicast group address to allow cooperative communication enabled devices to join a multicast group corresponding to the multicast group address;
   receive requests from the cooperative communication enabled devices to join the multicast group; and
   control a wireless transmission of cooperative communication messages to the multicast group via multicast communications.

12. The computer-readable medium of claim 11, comprising a WiFi Aware layer to coordinate the multicast communications through a Wireless Access for Vehicular Environments (WAVE) Media Access Controller (MAC).

13. The computer-readable medium of claim 12, comprising a Dedicated Short-Range Communications (DSRC) application and a Wave Short Message Protocol (WSMP) layer that provides message passing services to DSRC application, wherein the WiFi Aware layer provides a multicast service to the DSRC application and WSMP layer.

14. The computer-readable medium of claim 11, wherein the multicast group address comprises a location and distance that define a geographical region of the multicast group.

15. The computer-readable medium of claim 11, comprising instructions to direct the processor to dynamically update the multicast group address to limit a number of cooperative communication enabled devices that can join the multicast group.

16. The computer-readable medium of claim 15, wherein to dynamically update the multicast group address, the instructions direct the processor to update a distance based at least in part on traffic density.

17. The computer-readable medium of claim 11, comprising instructions to direct the processor to dynamically update the multicast group address based on movement and services offered.

18. The computer-readable medium of claim 11, comprising instructions to direct the processor to select a channel on which to transmit the cooperative communication messages, wherein the multicast group address is based in part on the channel.

19. The computer-readable medium of claim 11, wherein the computer-readable medium is configured to be included in a stationary roadside unit.

20. The computer-readable medium of claim 11, wherein the computer-readable medium is configured to be included in a vehicle configured to provide a platooning service via multicast communications.

21. A method of providing cooperative communication messages via multicast, comprising
generating a multicast group address based, at least in part, on a geographical region of a multicast group;
broadcasting the multicast group address to allow cooperative communication enabled devices to join the multicast group;
receiving requests from the cooperative communication enabled devices to join the multicast group; and
transmitting cooperative communication messages to the multicast group via multicast communications.

22. The method of claim 21, comprising coordinating the multicast communications by a WiFi Aware service that controls a Wireless Access for Vehicular Environments (WAVE) Media Access Controller (MAC).

23. The method of claim 22, comprising providing message passing services to a Dedicated Short-Range Communications (DSRC) application through a Wave Short Message Protocol (WSMP) layer, wherein the WiFi Aware service provides a multicast service to the DSRC application and the WSMP layer.

24. The method of claim 21, wherein the multicast group address comprises a location and distance that define a geographical region of the multicast group.

25. The method of claim 21, comprising dynamically updating the multicast group address to limit a number of cooperative communication enabled devices that can join the multicast group.

* * * * *